United States Patent [19]

Oishi

[11] Patent Number: 4,886,220

[45] Date of Patent: Dec. 12, 1989

[54] MAGNETIC TAPE CASSETTE

[75] Inventor: Kengo Oishi, Kanagawa, Japan

[73] Assignee: Fuji Photo Film Co., Ltd., Kanagawa, Japan

[21] Appl. No.: 247,142

[22] Filed: Sep. 21, 1988

[30] Foreign Application Priority Data

Sep. 21, 1987 [JP] Japan .................. 62-234954

[51] Int. Cl.⁴ ............... G11B 15/08; G11B 23/087
[52] U.S. Cl. .................. 242/188; 242/198; 360/74.6; 360/132
[58] Field of Search ............. 242/188, 198; 360/742, 360/132

[56] References Cited

U.S. PATENT DOCUMENTS 4,380,032  4/1983  Pfost ........................ 360/74.6
4,638,393  1/1987  Oishi et al. ................ 242/198 X Primary Examiner—David Werner Attorney, Agent, or Firm—Sughrue, Mion, Zinn, Macpeak & Seas

[57] ABSTRACT

A magnetic tape cassette of the type in which the tape is pulled out of the front of the cassette for recording and playback having a simplified but more reliable structure made possible by combining functions of a winding body brake and tape end detector integrally in a single member. A winding body brake is composed of a pair of commonly pivoted braking sections, each having a braking claw and operating section. The two operating sections cooperate to close an opening in the cassette when the cassette is not in use. To play or record on the cassette, an insert is inserted into the hole, moving apart the operating sections and thereby disengaging the braking claws from the teeth of tape winding bodies on which the magnetic tape in the cassette is wound. The insert also includes a light source or sources for detecting the ends of the tape.

6 Claims, 2 Drawing Sheets

MAGNETIC TAPE CASSETTE

BACKGROUND OF THE INVENTION

The present invention relates to a magnetic tape cassette, particularly to a magnetic tape cassette through the front of which a magnetic tape is pulled out to perform recording or playback.

High-density recording has recently been performed on magnetic tape in a conventional magnetic tape cassette such as a video tape cassette of the VHS TM or Beta TM format. The magnetic tape cassette is usually constructed so that the magnetic tape can be pulled out of the cassette through the front opening thereof. The cassette is provided with a turnable guard panel for opening and closing the front opening of the cassette. When the magnetic tape cassette is not in use, the guard panel is closed over the front opening to protect the magnetic tape and prevent dust or the like from entering the cassette. When the cassette is to be used for recording, playback or the like, the guard panel is opened from the front opening and a tape pull-out member provided in a recording/playback apparatus is moved around to the back (non-magnetic side) of the magnetic tape to pull out the tape. The peripheral portions of the flanges of tape winding bodies on which the magnetic tape is wound are provided with teeth. When the cassette is not in use, a winding body brake is engaged with the teeth to prevent rotation of the tape winding bodies to keep the magnetic tape from slackening, jamming or the like. The winding body brake can be disengaged from the teeth of the flanges of the tape winding bodies by a brake disengaging lever moved into the cassette through a hole in the bottom of the cassette. Such a cassette is disclosed in Japanese Unexamined Published Utility Model Applications Nos. 57184/80 and 1415485/83.

An optical method for detecting the start and termination of running of the tape has also been used in a conventional magnetic tape cassette, as disclosed in the Japanese Unexamined Published Utility Model Application No. 50078/84. In the optical method, a light source is inserted into the cassette through a hole in the bottom thereof, and light from the light source is detected to sense the end of the magnetic tape to thereby control the drive of the recording/playback apparatus appropriately and automatically.

Since the conventional magnetic tape cassette requires holes for moving members such as the brake disengaging lever and the light source into the cassette as described above, the degree of dustproofing of the cassette is lowered due to the presence of the holes.

The construction of the conventional magnetic tape cassette is complicated because the cassette has a relatively large number of functions. It is desired to simplify the construction of the cassette to more effectively use the limited space in the cassette and to attain better quality control and higher reliability. Recently, various studies and development have been made in order to enable recording and playback with a higher quality For such purposes, the reliability of the conventional magnetic tape cassette should be made high enough to enable recording and playback at even higher densities.

SUMMARY OF THE INVENTION

The present invention was made in consideration of the above-mentioned circumstances.

Accordingly, it is an object of the present invention to provide a magnetic tape cassette in which members for performing a larger number of functions can be housed in a limited space and in which a high performance is enabled.

In a magnetic tape cassette provided in accordance with the present invention, which is of the type in which the tape is pulled out of the cassette to perform recording and playback, a pair of tape winding bodies on which a magnetic tape is wound are provided. The magnetic tape cassette is characterized in that an insert, which is moved into the cassette to detect the end of the magnetic tape through the use of light, is engaged with a winding body brake provided to prevent the rotation of the tape winding bodies, and is then moved so that the winding body brake is disabled.

DESCRIPTION OF THE PREFERRED EMBODIMENTS

Preferred embodiments of the present invention are hereafter described with reference to the attached drawings.

Figure 1:
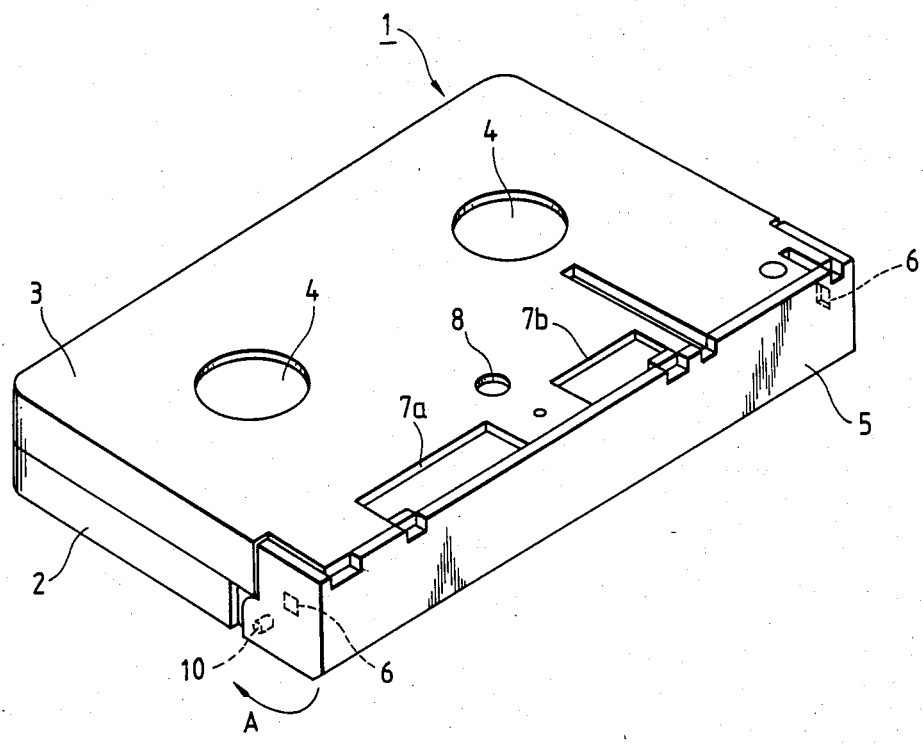
FIG. 1 shows a perspective view of a magnetic tape cassette constructed according to a preferred embodiment of the present invention.
Figure 2:
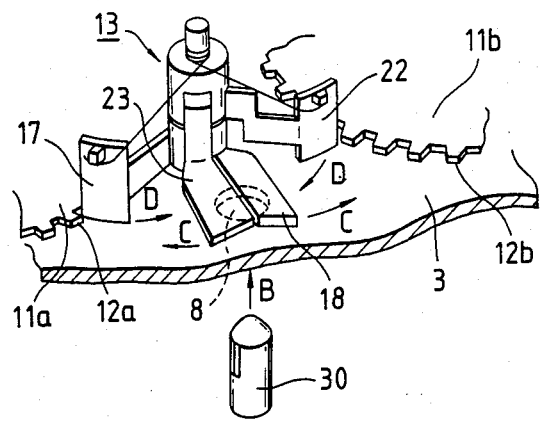
FIG. 2 shows a perspective view of a winding body brake provided in the magnetic tape cassette.
Figure 3:
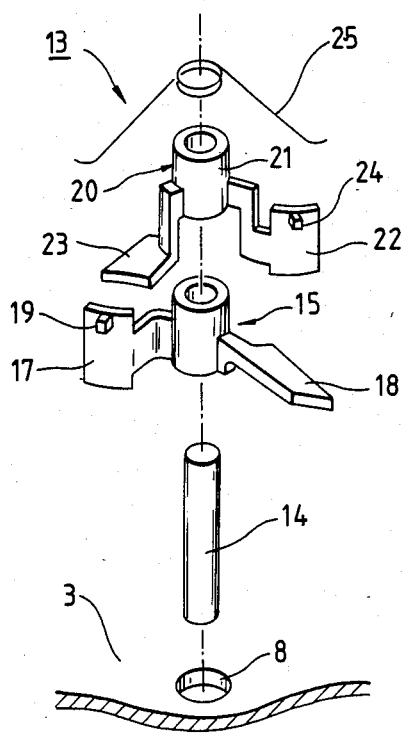
FIG. 3 shows an exploded perspective view of the winding body brake.

FIG. 1 shows a perspective bottom view of a magnetic tape cassette 1 constructed according to a preferred embodiment of the invention. FIG. 2 shows a perspective view of a winding body brake 13 of the magnetic tape cassette 1. FIG. 3 shows an exploded perspective view of the winding body brake 13.

A pair of tape winding bodies such as a reel having a flange, on which a magnetic tape is wound, are rotatably supported in the body of the magnetic tape cassette 1. The body of the cassette 1 is composed of upper and lower half portions 2 and 3.

The constitution of the cassette 1 is nearly the same as that of a conventional video tape cassette of the VHS TM -format type or the like, except for the winding body brake 13 and a tape end detector.

The winding body brake 13 shown in FIG. 2 is provided between the center of the body of the cassette 1 and the front thereof, positioned so that the brake is disengaged from the teeth 12a and 12b of the lower flanges 11a and 11b of the tape winding bodies by the action of a rod-like insert 30 moved into the body of the cassette through the hole 8 of the lower half portion 3 of the cassette. The winding body brake 13 includes a first brake section 15 and a second brake section 20, which are turned about a pivot 14 projecting from the lower half portion 3 of the body of the cassette 1. The first brake section 15 has a first body 16 which is cylindrically shaped and through which the pivot 14 extends. The first brake section 15 also has a first engaging claw 17 extending from the first body 16 toward the teeth 12a, and a first operating portion 18 extending toward the hole 8. The second brake section 20 has a second body 21, through which the pivot 14 extends, a second engaging claw 22 extending from the second body toward the other teeth 12b, and a second operating portion 23 extending toward the hole 8.

As shown in FIG. 3, the first brake section 15, the second brake section 20, and a torsion spring 25 are fitted in that order on the pivot 14. The torsion spring 25, which is engaged at both ends thereof with the bottoms of spring engaging portions 19 and 24 of the first and second engaging claws 17 and 22, urges the claws so that the first engaging claw 17 is engaged with the teeth 12a, the second engaging claw 22 is engaged with the other teeth 12b, and the first and the second operating portions 18 and 23 contact with each other and close the hole 8.

The forms of the first and the second engaging claws 17 and 22 are not limited as far as they enable the claws to be engaged with the teeth 12a and 12b. For example, the first and the second engaging claws 17 and 22 can be shaped as plates extending in the direction of thickness of the cassette 1, as shown in FIG. 3. The forms of the operating portions 18 and 23 too are not limited. For example, the operating portions 18 and 23 can be shaped as plates extending along the inside bottom surface of the cassette 1 and capable of closing the hole 8, as shown in FIGS. 2 and 3. It is preferable that the operating portions 18 and 23 be appropriately inclined as a whole, or at least the surfaces of the operating portions facing the inside bottom surface of the cassette 1 be inclined, in order to more easily provide component forces for rightward and leftward movement as the insert 30 is moved into the cassette and comes into contact with the operating portions.

Figure 4:
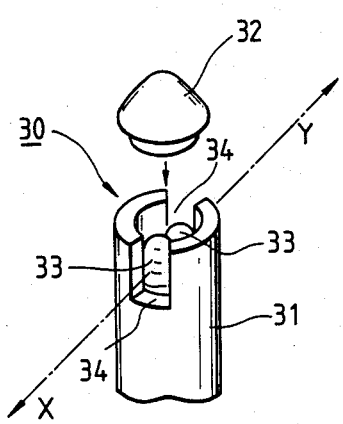
FIG. 4 shows an exploded perspective view of an insert shown in FIG. 2.

The recording playback apparatus in which the magnetic tape cassette 1 is loaded is provided with a rod-like insert 30 in a position corresponding to that of the hole 8 of the cassette. As shown in FIG. 4, two light sources 33, such as light-emitting diodes, are provided in the body 31 of the insert 30, which has a notch 34 for projecting light rightward and leftward from the light sources substantially in the longitudinal direction of the cassette 1. The insert 30 includes a contact portion 32 attached at the top of the insert and which contacts the operating portions 18 and 23. The contact portion 32 is appropriately pointed at the tip thereof and covers and protects the light sources 33.

When the magnetic tape cassette 1 is loaded in the recording/playback apparatus, a retainer holding the cassette is moved down so that the insert 30 is moved into the cassette through the hole 8 in a direction B indicated in FIG. 2. At that time, the contact portion 32 of the insert 30 starts moving the operating portions 18 and 23 away from each other. The insert 30 is then moved further into the cassette 1 so that the contact portion 32 of the insert moves the operating portions 18 and 23 away from each other by the diameter of the insert against the force of the torsion spring 25 in a direction C. At that time, the first and second engaging claws 17 and 22 are moved toward each other in a direction D so that they are disengaged from the teeth 12a and 12b. As a result, the tape winding bodies with the magnetic tape wound thereon are rendered rotatable. Along with the downward movement of the retainer, a guard panel 5 is opened about pivots 10 at both ends of the guard panel in a direction A indicated in FIG. 1, a tape pull-out member enters the cassette 1 through the openings 7a and 7b in the lower half portion 3 of the cassette, and winding body shafts for rotating the tape winding bodies are inserted into the winding body shaft holes 4 of the lower half portion of the cassette.

The insert 30 not only functions to unlock the winding body brake 13 as described above, but also functions to detect the end of the magnetic tape. For the detecting operation, the light projected rightward and leftward from the light sources 33 provided in the insert 30 passes across the tape path and passes through the openings 6 of the right and left side walls of the cassette 1 so that the light is received by light detectors facing the openings 6. The presence of the magnetic tape and that of the leading tapes, which are joined to the ends of the magnetic tape and differ in transmittance therefrom, are thus detected, and the running of the magnetic tape is controlled on the basis of detection signals produced by the light detectors.

Since the winding body braking part and tape end detecting part of the magnetic tape cassette 1 are not separately provided as done in a conventional VHS TM -type tape cassette but are constructed integrally, the cassette 1 does not need to be provided with two holes for inserting a brake disengaging lever and light source, as in the conventional video tape cassette. For that reason, the dustproofing property of the cassette 1 is high. Also, the number of ribs, projections, etc., in the cassette 1 is minimized, simplifying the overall construction of the cassette and more effectively using the limited space in the cassette. This makes it possible to provide larger tape winding bodies, members for new functions, or the like in the cassette. The performance and reliability of the magnetic tape cassette 1 can thus be improved.

Since the brake disengaging device and the light sources for the magnetic tape cassette 1 are integrally provided by the single insert 3, the brake disengaging device and the light sources do not need to be separately provided in the recording/playback apparatus.

Figure 5:
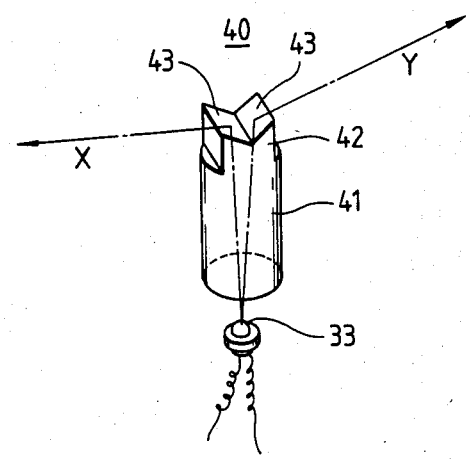
FIG. 5 shows a perspective view of another insert for a magnetic tape cassette constructed according to another embodiment of the present invention.

The present invention is not limited to the above-described embodiment and may be otherwise be embodied so that a winding body brake different in form from the winding body brake 13 and an insert constituted as shown in FIG. 5 are provided, for example. The insert 40 shown in FIG. 5 is made of a high-transmittance material such as transparent synthetic resin or glass. The body 41 of the insert 40 is shaped as a cylinder or prism. An optical prism 42 is provided at the tip of the body 41. The top of the prism 42 is composed of two faces extending downward to the center line of the top. The slopes have reflecting surfaces 43 which reflect light proceeding upward through the body 41 of the insert 40 from a single light source 33 provided under the insert in rightward and leftward directions Y and X so that the reflected light is received by respective light detectors. As for the insert 40 having the prism 42 and provided over the light source 33, only one light source is needed, the light source is easily protected from damage, and it is very easy to ensure the accuracy of optical paths in the rightward and the leftward directions Y and X.

According to the present invention, a winding body braking part and a tape end detecting part are integrally provided for a magnetic tape cassette, and an insert having a function of projecting light is used to disengage a winding body brake in the cassette. Therefore, the same functions as in a conventional magnetic tape cassette can be performed in a smaller space than in a conventional cassette, and the internal construction of the cassette is simplified, enhancing the manufacturing ease and reliability of the cassette. Although an insert for projecting light needs to be provided in the recording/playback apparatus, no member used disengaging the winding body brake need be provided as in a conventional apparatus.

What is claimed is:

1. A magnetic tape cassette system comprising: a cassette body, a tape being pulled out of said cassette body to perform recording or playback; a pair of tape winding bodies on which said magnetic tape is wound rotatable mounted in said cassette body; a brake for both said winding bodies; and an insert movable into said cassette for detecting an end of said tape through the use of light, said insert being alternately engaged with said winding body brake for preventing rotation of both said winding bodies and moved to a position so that said brake is disabled, wherein said cassette body has left and right sides containing first and second apertures therein, respectively, said insert having a light source positioned and adapted for emitting a first beam of light through said first aperture and a second beam of light through said second aperture, said first and second beams being emitted in substantially opposite directions for detecting the end of said tape at either of first and second positions along said tape with respect to a direction of movement of said tape, said first and second positions being located along respective paths of said first and second beams.

2. The magnetic tape cassette system according to claim 1, wherein said insert comprises a contact portion at a tip of said insert for covering said light source.

3. The magnetic tape cassette system according to claim 1, wherein said insert comprises a prism at a tip of said insert for forming said first and second beams by bisecting light incident thereto.

4. The magnetic tape cassette system of claim 1, wherein said winding body brake comprises: a pivot projecting from said cassette body; first and second brake sections rotatably mounted on said pivot, each of said brake sections having an engaging claw for engaging teeth of a respective one of said tape winding bodies and an operating portion, said projecting portion extending toward said hole and being movable apart from one another when said insert is inserted into said hole.

5. The magnetic tape cassette system of claim 4, wherein, when said insert is not inserted into said hole, said operating portions cooperate to close said hole.

6. The magnetic tape cassette system of claim 4, further comprising a torsion spring biasing said brake sections such that said operating portions are urged towards one another.

* * * * *